LINEAR POWER TRANSDUCER WITH NON-LINEAR FEEDBACK NETWORK

Filed Dec. 9, 1968 2 Sheets-Sheet 1

INVENTORS
DUDLEY D. NYE, JR.
ARLEY L. KEITH, JR.

BY Le Blanc & Shur

ATTORNEYS

LINEAR POWER TRANSDUCER WITH NON-LINEAR FEEDBACK NETWORK

Filed Dec. 9, 1968

INVENTORS
DUDLEY D. NYE, JR.
ARLEY L. KEITH, JR.

BY Le Blanc & Shur
ATTORNEYS

United States Patent Office 3,553,569
Patented Jan. 5, 1971

3,553,569

LINEAR POWER TRANSDUCER WITH NON-LINEAR FEEDBACK NETWORK

Dudley D. Nye, Jr., and Arley L. Keith, Jr., Fort Lauderdale, Fla., assignors to Airpax Electronics Incorporated, Fort Lauderdale, Fla., a corporation of Maryland Filed Dec. 9, 1968, Ser. No. 782,243
Int. Cl. G05f 1/44
U.S. Cl. 323—22 17 Claims

ABSTRACT OF THE DISCLOSURE

Disclosed is an electrical transducer for controlling high energy electrical power from a low level D.C. source, and a temperature regulating system incorporating the transducer. A nonlinear negative feedback network is incorporated in the transducer and feeds back to the input a signal directly proportional to the instantaneous square of the current through the load. The feedback signal is averaged so that output power is linearly related to the low level control input.

This invention relates to a power transducer for converting a control signal into electrical output power and more particularly is concerned with a transducer in which the electrical output power is linearly related to the input control signal. In the present invention, the power transducer incorporates negative feedback which feeds back to the input a signal directly proportional to the square of the instantaneous value of the output voltage or current. The feedback signal is averaged and balanced against the input or control signal so that output power is linearly related to the input.

Power transducers are well known and are frequently used in conjunction with a controller to control the power supplied to an electrical load. In systems of this type, the amount of high energy power supplied to the load is determined and controlled by a low level or low energy input signal from a sensing source. For example, one or more temperature sensing elements, such as thermocouples, may sense the temperature in a furnace and develop a control signal related to temperature which controls the amount of power supplied from a power source to one or more heating elements of the furnace.

However, insofar as applicants are aware, none of the previously proposed systems provide a linear relationship between input signal and power output to the load. Some systems have provided a linear relationship between RMS output and the input signal and have also provided a linear relationship between average output and the input signal. However, none have provided a linear relationship between input and output power. As a result, the prior systems have suffered from the disadvantages that they have been unable to provide a constant proportional gain and the power output to the load varies with changes in the power source supplying load power.

The power transducer of the present invention avoids these and other difficulties by providing an electrical network which creates a linear relationship between the output power supplied to the load and the input or control signal from the sensing element, i.e., thermocouple. This results in a constant proportional gain when the system is used with a temperature controller and, in addition, the power output is independent of the power source or powerline voltage. Linearity is obtained in the transducer of this invention through the utilization of a nonlinear, diode feedback network which provides negative feedback from the output to the input of the transducer. The nonlinear feedback network supplies a feedback current to the input having an instantaneous value directly proportional to the square of the instantaneous value of the current applied to the load. The feedback signal is averaged and the average value of the feedback current balances the input signal current. As a result, the average value of the squared output current waveform is then linearly related to the input signal. By definition, this means that the square of the RMS output or the power is linearly related to the input signal and the power output is independent of the A.C. line voltage or power source for the load.

It is therefore one object of the present invention to provide an improved power transducer.

Another object of the present invention is to provide a power transducer in which the output power is linearly related to the input signal.

Another object of the present invention is to provide a linear power transducer in which the power supplied to the load is independent of variations in load source.

Another object of the present invention is to provide a linear power transducer incorporating a nonlinear negative feedback network for supplying to the input a signal directly proportional to the square of the load current.

Another object of the present invention is to provide a linear power transducer incorporating a nonlinear negative feedback network comprising a plurality of rectifier diodes for developing a feedback signal directly proportional to the square of the load current, which feedback signal is averaged and balanced against the input signal to the transducer.

Another object of the present invention is to provide a temperature control or regulating system incorporating a linear power transducer.

These and further objects and advantages of the present invention will become more apparent upon reference to the following specification, claims, and appended drawings wherein:

Figure 1:
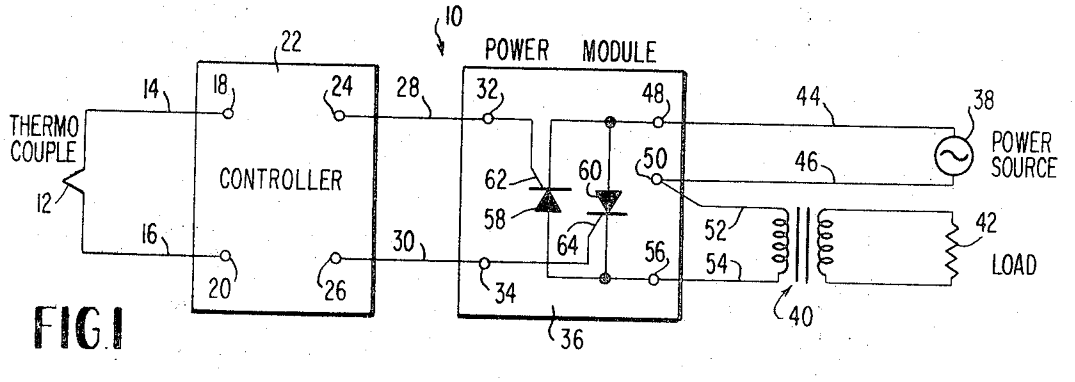
FIG. 1 is a simplified block diagram of a temperature control system constructed in accordance with the present invention.

Referring to the drawings, the overall temperature control system of the present invention is generally indicated at 10 in FIG. 1. In the preferred embodiment illustrated, the system 10 takes the form of a temperature control system used to proportion electrical power supplied to the heating element of a furnace. The system is particularly adapted for temperature control of diffusion and conveyor furnaces incorporating electrical heating elements.

In FIG. 1, a temperature sensing element in the form of an electrical thermocouple 12 is connected by way of leads 14 and 16 to the input terminals 18 and 20 of a controller 22. Controller 22 is of conventional construction and develops a control signal at its output terminals 24 and 26 related to the temperature within a furnace as sensed by thermocouple 12 and the signal developed by the thermocouple on input leads 14 and 16 to the controller. For example, controller 22 compares the microvolt signal from the thermocouple 12 with a very stable reference supply. The "error signal" is amplified by a low level D.C. magnetic amplifier and displayed as a "deviation" from the reference. The amplified error signal is further amplified in controller 22 and conditioned to account for the dynamics of the process before it appears as a controller output signal at output terminals 24 and 26.

The low level D.C. or slowly varying A.C. output signal from controller 22 is supplied over leads 28 and 30 to the input terminals 32 and 34 of a power module 36. Power module 36 controls the power supplied from an electrical power source 38 by way of transformer 40 to a load 42. In the preferred embodiment, power source 38 is a 200 or 225 volt 60 Hz. sinusoidal source and may comprise a conventional commercial power main supply. Load 42 is preferably in the form of a resistive heating element for the furnace and supplies heat to the furnace in accordance with the temperature sensed by thermocouple 12.

Power source 38 is connected to the power module 36 by leads 44 and 46 and power terminals 48 and 50. Transformer 40 is connected by leads 52 and 54 to power terminal 50 and to a load terminal 56 of the power module. Power module 36 includes a pair of oppositely poled silicon controlled rectifiers 58 and 60 connected in parallel across power module terminals 48 and 56. Gates 62 and 64 of the SCR's are connected through other circuitry in the power module as described below to the signal terminals 32 and 34 of the power module.

Figure 2:
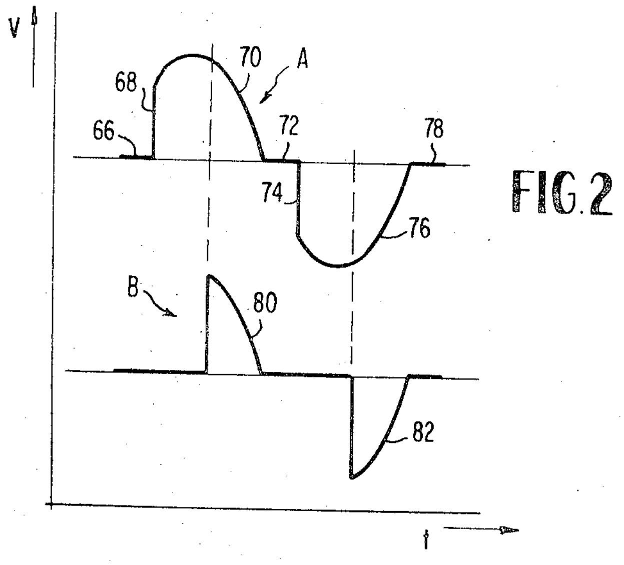
FIG. 2 is a plot of voltage as a function of time showing the waveforms of the voltage applied to the load under full power and partial power conditions.

The function of the power module 36 is to chop the sinewave from power source 38 in accordance with the control signal applied to terminals 32 and 34 so as to vary the power supplied from source 38 to load 42 in accordance with the magnitude of the control signal. More particularly, the firing point of SCR's 58 and 60 is phase controlled by the input signal so that the SCR's fire at different points in a cycle of the power source sinusoid in accordance with the magnitude of the input signal. Waveform A in FIG. 2 shows the chopped sine wave supplied to load 42 when the thermocouple 12 calls for full power. During the first portion of the sinusoid cycle, both SCR's 58 and 60 are turned off, as indicated at 66 in waveform A. Firing of one of the SCR's such as SCR 60 is indicated by the steeply rising portion of the waveform at 68 and this SCR remains conducting and follows the sinusoidal curve at 70 of power source 38 until the sinusoidal curve passes through zero at which time both SCR's are again cut off as indicated by waveform A at 72. At a point during the negative half cycle of the power source, again as determined by the signal from thermocouple 12, the other SCR, i.e., SCR 58, fires and this is indicated by the steep negative going portion of the waveform at 74. Conduction of the second SCR causes the load signal to follow the negative portion of the sinusoid as indicated at 76 until the sinusoid again passes through zero and both SCR's are cut off as at 78, after which the cycle repeats itself.

Waveform B in FIG. 2 shows the voltage applied to the load during intermediate conditions, i.e., when the thermocouple is calling for only partial power to the furnace heating element. In this case, the SCR's fire at a later point in the power source cycle to produce the abbreviated chopped sinusoids 80 and 82 illustrated by waveform B. Waveform A represents full power, i.e., the full sinusoid is never applied to the load. However, 95% power is reached as a maximum output. Waveform B represents an intermediate condition, i.e., partial power to the load, it being understood that when thermocouple 12 calls for no power, neither of the SCR's fire at any point in the cycle of the power source and no power is applied to the heating element 42.

Figure 3:
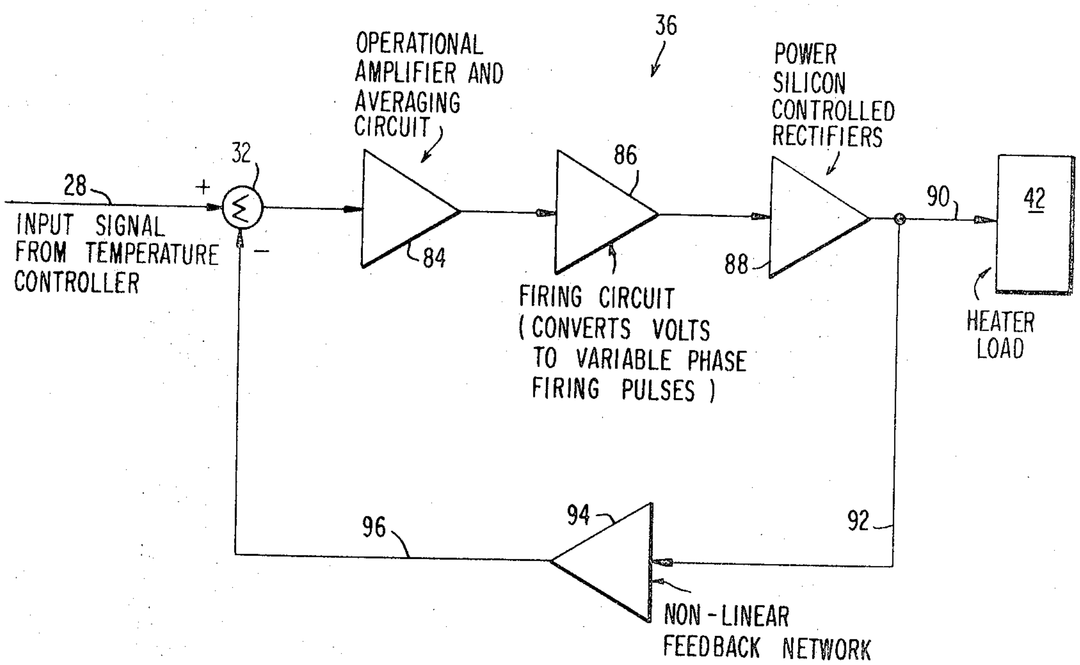
FIG. 3 is a simplified block diagram of the linear power transducer forming a part of the temperature control system of FIG. 1.

FIG. 3 is a simplified block diagram of the linear power module 36 of FIG. 1. The low level input signal 28 from the temperature controller 22 of FIG. 1 is applied to the power module input terminal 32. Connected to the input terminal is an operational amplifier and averaging circuit 84 which supplies an averaged signal to a firing circuit 86 which converts the signal to variable phase firing pulses for the power silicon controlled rectifier circuit indicated generally at 88 in FIG. 3. It is understood that the rectifier circuit at 88 of FIG. 3 includes rectifiers 58 and 60 of FIG. 1 connected to the power source and load in the manner illustrated in FIG. 1. Rectifier circuit 88 supplies variable power to heater load 42 which is illustrated diagrammatically in FIG. 3 by the arrow on line 90 to resistor 42.

A feedback voltage proportional to the current through resistive load 42 is taken from across the load by way of feedback lead 92 to a nonlinear feedback network 94. Nonlinear feedback network 94 preferably includes a plurality of rectifier diodes and resistors (but may be a single nonlinear resistance element) such that it develops on its output lead 96 a signal directly proportional to the square of the instantaneous signal appearing on feedback lead 92, i.e., directly proportional to the square of the instantaneous current passing through the heater load 42. The voltage signal on lead 96 is algebraically summed with the input signal from the controller 22 of FIG. 1 on signal lead 24 at input terminal 32. That is, the feedback signal 96 is subtracted from or balanced against the input signal on lead 28 and is averaged in circuit 84.

As is well known, the heating effect of an alternating current is independent of the direction of flow. This forms a basis for comparison of an alternating current with continuous currents in terms of its effective or RMS value. The sinusoidal or other alternating current is said to have an effective or RMS value of 1 ampere when it produces heat in a certain resistance at the same average rate at heat is produced in the same resistance by 1 ampere of continuous current. Since the heating effect of a continuous current is proportional to the square of its value, i.e., $I^2R$, the heating effect of an alternating current at any instant is proportional to the square of its value at that instant. Therefore, by producing in nonlinear feedback network 94 a voltage signal on lead 96 with an instantaneous value which is proportional to the square of the instantaneous voltage drop across heater load 42 and therefore proportional to the square of the instantaneous current through this resistive load, and averaging the signal in circuit 84, the negative feedback produces a transfer characteristic for the power module in which the square of the RMS output, which by definition is proportional to output power, is linearly related to the input signal, i.e., input voltage on line 28 to summation device 32. The output power is equal to $K_1RMS^2$ where $K_1$ is a proportionality constant determined by the parameters of the system.

Figure 4:
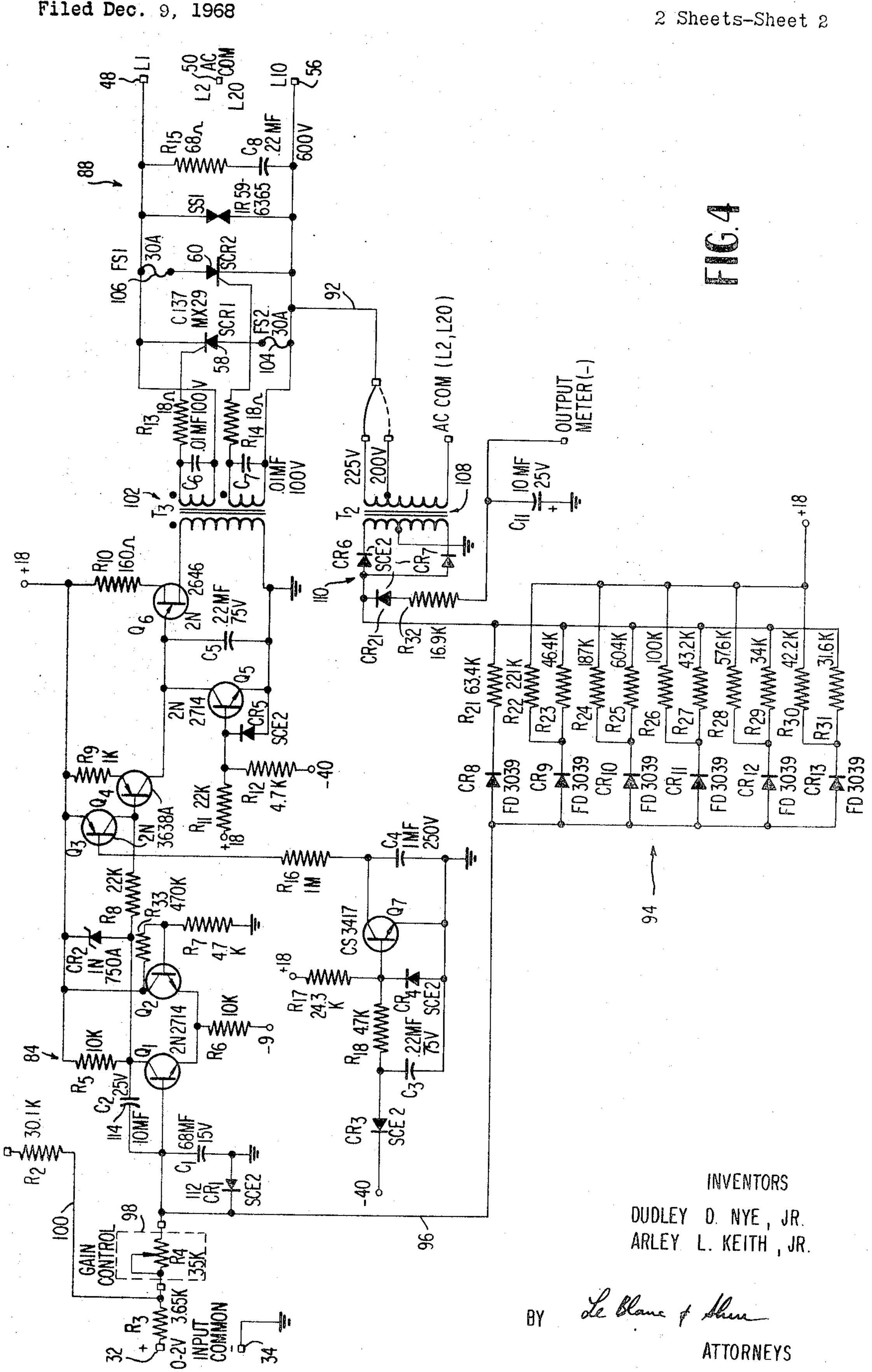
FIG. 4 is a detailed circuit diagram of the linear power transducer of FIG. 3.

FIG. 4 is a detailed circuit diagram of the linear power transducer or power module 36 of FIGS. 1 and 3 and like parts bear like reference numerals. In FIG. 4, the low energy D.C. control signal from controller 22 of FIG. 1 is applied to the transducer input terminals 32 and 34. The signal passes through a gain control potentiometer 98 to circuit 84 including transistors $Q_1$ and $Q_2$. Gain control potentiometer 98 receives a bias control signal from a suitable source (not shown) by way of bias control lead 100. The control signal is then applied to firing circuit 86 including transistors $Q_3$ and $Q_4$ and unijunction transistor $Q_6$ which supplies firing pulses to a pulse transformer 102 labeled $T_3$. The pulses from the transformer 102 are applied to the gates of the SCR's 58 and 60 to fire the SCR's in a manner previously described. The SCR's are connected in series with overload protection fuses 104 and 106. $SS_1$ is a selenium transient protector while resistor $R_{15}$ and capacitor $C_8$ form a "snubbing circuit" which permits the SCR's to establish holding current when fired with narrow gate pulses.

A feedback signal is developed on lead 92 in FIG. 4 in the form of a voltage directly proportional to the current flowing through the resistive heater load connected across terminals 50 and 56. The feedback signal passes through a pulse transformer 108 and through a fullwave rectifier 110 comprising rectifier diodes $CR_6$ and $CR_7$. The rectifier converts the chopped sinewave pulses into unidirectional pulse, i.e., pulses having the same polarity but with no change in shape. For example, if the chopped sine pulses to the load have the configuration of the pulses 80 and 82 in FIG. 2, the effect of the transformer is to flip pulse 82 over so that it is a positive going pulse similar to pulse 80 of FIG. 2. The unidirectional pulses then pass through nonlinear feedback ladder network 94 comprising a series of rectifier diodes $CR_8$ through $CR_{13}$ and a plurality of resistors labeled $R_{21}$ through $R_{31}$ in FIG. 4. The voltage developed on lead 96 is a series of unidirectional pulses which are everywhere directly proportional to the square of the instantaneous value of the pulses applied to the feedback network 94. These squared feedback pulses are then averaged by capacitors 112 and 114 and the average value of the feedback current balances the input signal current through resistors $R_3$ and $R_4$ in FIG. 4.

By way of example only, the input signal to terminals 32 and 34 from the controller may vary between zero and +1.8 volts D.C. This signal is amplified by the differential amplifier formed by transistors $Q_1$ and $Q_2$. The amplified signal appears across resistor $R_5$ and is converted into a current source by transistor $Q_4$ and resistor $R_9$. This current charges capacitor $C_5$ in FIG. 4 up to the firing level of the unijunction transistor $Q_6$ (approximately 11 volts). Capacitor $C_5$ discharges suddenly into the pulse transformer $T_3$ and this pulse fires the SCR's 58 and 60. The instant at which the pulse occurs within each half cycle of the power line is controlled by the magnitude of the input signal to terminals 32 and 34. The higher the input signal, the higher the current into capacitor $C_5$ and the sooner the threshold voltage of unijunction transistor $Q_6$ is reached. The result is a firing of the SCR's earlier in the cycle and the yielding of a higher power output into the furnace heating element. Zener diode $CR_2$ limits the maximum signal and therefore the maximum conduction angle. Transistor $Q_5$ synchronizes the firing circuit with the power line. This is, transistor $Q_5$ shorts and discharges capacitor $C_5$ at the end of every half cycle. This is made possible by connecting transistor $Q_5$ to a −40 volt supply in the form of an unfiltered fullwave rectified waveform that goes to zero at the end of each half cycle, while the regulated +18 volt supply turns transistor $Q_5$ on.

Transistor $Q_7$ provides a soft start feature that makes the A.C. output of the power module build up slowly upon application of power from the power line. This feature prevents fuse blowing with transformer loads which can draw high inrush currents in the first half cycle. When power is first applied, transistor $Q_7$ is open and remains open. Transistor $Q_3$ shorts because a base current is established through resistor $R_{16}$ until capacitor $C_4$ charges up. As the base current decreases, transistor $Q_3$ opens up slowly and allows the controller signal to phase-fire the SCR's, always starting from zero conduction angle. In case of an instantaneous power failure, the unfiltered −40 volts at the base of transistor $Q_7$ disappears instantly, $Q_7$ is shorted by the +18 volts through resistor $R_{17}$ and capacitor $C_4$ discharges in microseconds. When the power line voltage reappears, a soft start is again insured. Transformer $T_2$ senses the output voltage of the power module and provides a feedback signal through the nonlinear network 94 made up of diodes $CR_8$ through $CR_{13}$ and resistors $R_{21}$ through $R_{31}$. As a result, the power output of the power module is a linear function of the input signal and the feedback network also makes the power output insensitive to line voltage variations.

It is apparent from the above that the present invention provides an improved linear power transducer and an improved temperature control system incorporating the transducer. Linearity is made possible through the incorporation of negative feedback and more particularly through the incorporation of a negative feedback network which produces a signal directly proportional to the square of the instantaneous value of the current flowing through the heater load. In the preferred embodiment, a voltage proportional to the voltage drop across the resistive element of the heater is squared in the feedback circuit and this squared voltage is averaged and balanced against the input voltage signal from the controller. The result is that power applied to the resistive element of the heater is linearly related to the input voltage signal to the transducer and, furthermore, the power applied to the heater resistor is independent of any varations in the A.C. power supply source or A.C. line. Since by definition the square of the root mean square, i.e., $RMS^2$, is equal to the average of the instantaneous value of the voltage squared, the power supplied to the heater element is by feedback linearly related to the input signal. While the invention has been described in conjunction with a feedback signal proportional to the square of the output, it is understood that this may vary somewhat and the feedback circuit may develop a signal in which the exponent is greater than 2 (such as 2.2) to compensate for low loop gain and other imperfections.

What is claimed and desired to be secured by United States Letters Patent is:

1. An electrical transducer for converting a low energy input signal to a high energy electrical output comprising an electrical input for receiving a low energy input signal, an output for supplying a high energy electrical output to a load, a converter coupled between said input and output for converting said input signals into a high energy electrical output, and a nonlinear negative feedback network coupled between the input and the output of said converter and forming an uninterrupted path for electrical energy between said input and output, said feedback network applying a signal to said input which is directly proportional to substantially the square of the instantaneous value of said high energy output.

2. A transducer according to claim 1 including an averaging circuit coupled to said converter and said feedback network for averaging the feedback signal applied to said input.

3. A transducer according to claim 1 wherein said converter comprises means for converting a D.C. input into a high energy pulse output.

4. An electrical transducer for controlling the flow of power to a load comprising a variable impedance, means for coupling said impedance between a power source and a load, control means coupled to said impedance for varying its value in accordance with a control signal from said control means, and a nonlinear negative feedback network coupling said impedance to said control means and forming an uninterrupted path for electrical energy between said impedance and said control means, said network feeding a signal to said control means directly proportional to substantially the instantaneous square of the current flowing through said impedance.

5. A transducer according to claim 4 wherein said impedance comprises a semiconductor.

6. A transducer according to claim 4 wherein said impedance comprises a semiconductor switch, and said control means comprises a converter for converting an input signal into a plurality of timing pulses for actuating said switch.

7. A transducer according to claim 6 wherein said switch comprises a silicon controlled rectifier.

8. An electrical transducer for controlling the flow of electrical power to a load comprising a variable impedance, means for coupling said variable impedance between a power source and a load, control means including a converter coupled to said impedance, said converter converting an input signal into a control signal for varying said impedance in accordance with an input signal to said control means, and a nonlinear negative feedback network coupled between said impedance and the input to said control means and forming an uninterrupted path for electrical energy between said impedance and said input to said control means, said network feeding a signal to said control means directly proportional to the square of the instantaneous value of the current flowing through said impedance, said control means including means for averaging said signal from said feedback network.

9. A transducer according to claim 8 wherein said feedback network comprises a plurality of parallel rectifier diodes.

10. A transducer according to claim 8 wherein said feedback network comprises a ladder network of rectifier diodes and resistors.

11. A transducer according to claim 10 wherein said diodes are all the same, said resistors varying in value with each step of the ladder.

12. An electrical transducer for controlling the flow of electrical power to a load comprising at least one semiconductor switch, means for coupling said switch between a power source and a load, a variable timing circuit coupled to said switch for supplying actuating pulses to said switch variable in time in accordance with a control signal applied to said timing circuit, a nonlinear negative feedback network coupled between said switch and said timing network and forming an uninterrupted path for electrical energy between said switch and said timing network, said feedback network supplying a signal to said timing network directly proportional to the square of the instantaneous current flowing through said switch, and an averaging circuit coupled between said feedback network and said timing circuit for averaging the signal supplied by said network to said timing circuit.

13. A transducer according to claim 12 wherein said switch comprises a pair of oppositely poled silicon controlled rectifiers connected in parallel.

14. A transducer according to claim 12 including an amplifier coupled between said averaging circuit and said timing circuit, said timing circuit comprising a capacitor coupled to the emitter of a unijunction transistor.

15. A transducer according to claim 12 wherein said switch comprises a pair of oppositely poled silicon controlled rectifiers connected in parallel, said timing circuit comprising a capacitor coupled to the emitter of a unijunction transistor, and a transformer having separate secondary windings coupling the base 1-base 2 circuit of said unijunction transistor to the control gates of the respective silicon controlled rectifiers.

16. A temperature regulating system comprising a temperature sensor, means coupling the output of said sensor to a controller, a power module, means coupling the output of said controller to said power module, a sinewave power source and a heater load coupled to said power module, said power module including means for chopping the energy supplied from said source to said load at a rate proportional to the signal to said power module from said controller, and a nonlinear negative feedback network coupled between said load and the output of said controller and forming an uninterrupted path for electrical energy between said load and the output of said controller whereby the power supplied from said source to said load is linearly related to the output of said controller.

17. A system according to claim 16 wherein said feedback network includes means for producing an output which is proportional to the square of its input.

References Cited

UNITED STATES PATENTS

| | | | |
|---|---|---|---|
| 3,319,152 | 5/1967 | Pinckaers | 323—22(SCR) |
| 3,349,223 | 10/1967 | Barter | 323—22(SCR) |
| 3,395,334 | 7/1968 | Stein | 323—22(SCR) |
| 3,444,456 | 5/1969 | Codichini | 323—22(SCR) |

JAMES D. TRAMMELL, Primary Examiner

G. GOLDBERG, Assistant Examiner

U.S. Cl. X.R.

307—133, 269; 323—24, 38